Patented June 9, 1936

2,043,708

UNITED STATES PATENT OFFICE 2,043,708

PROCESS FOR PRODUCING ALIPHATIC CARBONYL COMPOUNDS AND ALCOHOLS

Hermann Prückner, Chemnitz, Germany, assignor to H. Th. Bohme Aktiengesellschaft, Chemnitz, Germany, a corporation of Germany No Drawing. Application June 16, 1932, Serial No. 617,686. In Germany July 15, 1931

26 Claims. (Cl. 260—156)

This invention relates to a process for treating the salts of fatty acids to produce aliphatic carbonyl compounds and primary alcohols, and has for its objects an increase in the yield of such products and an improvement in their purity.

It has heretofore been proposed to produce aldehydes of the fatty series by heating a mixture of calcium salts of the fatty acids with calcium formate. It is also known that aldehydes may be converted into the corresponding primary alcohols by catalytic reduction with hydrogen.

In accordance with the present invention these processes, normally carried out independently, are combined in one operation. For instance, I have discovered that the conversion of the calcium salts of the higher fatty acids having at least two carbon atoms and of formic acid, and as well the catalytic hydrogenation of the resulting aldehydes of the fatty series may be effected simultaneously with the result that primary alcohols of unusual purity are produced in an abundant yield. The reaction of the calcium salts is furthered and brought to a complete termination by the continuous removal of the aldehydes during the process, which removal is the result of the simultaneous conversion of the same to alcohols by catalytic reduction. Thus the equilibrium of the aldehyde formation reaction is continuously disturbed. As a result, the reaction may be carried out under milder conditions and much more completely than is possible when the aldehydes and the alcohols are produced by separate processes.

In this manner the calcium salt of lauric acid may be converted successively and continuously to lauric aldehyde and lauryl alcohol, and calcium stearate may be converted through the stearic aldehyde stage to stearyl alcohol in a single process.

The process may be carried out either at atmospheric or at elevated pressure, for example at about 100 to 200 atmospheres, and the temperature is preferably maintained between the approximate limits of 150° C. and 400° C. I have discovered further that the presence of a solvent such as tetralin, dodecane, or butyl alcohol favors to a very material extent the formation of the aldehyde. The solvent used is preferably the alcohol comprising the end product of the reaction. For instance, in the treatment of calcium laurate the preferred solvent is lauryl alcohol. In this manner the process is simplified by the elimination of the final step of separating the solvent from the end product.

Any well-known simple or compound hydrogenating catalyst may be used, either alone or precipitated on a suitable carrier and with or without previous reduction. Suitable examples are copper, nickel, and cobalt, catalysts and their combinations with one another or with chromium and other known activating agents.

One manner of carrying out the process is illustrated by the following.

Example I 15 parts by weight of calcium octylate and 15 parts by weight of calcium formate are dissolved or dispersed in 60 parts by weight of lauryl alcohol, the action of the solvent being assisted by moderate heating if necessary. The solution is then mixed with a copper catalyst, which may be prepared for example by precipitating copper carbonate on kieselguhr, washing, drying, and fine trituration. The amount of copper employed is preferably 1.6% by weight of the calcium octylate.

The mixture is introduced into a closed reaction vessel together with hydrogen under a pressure of approximately 110 atmospheres. Heat is applied to increase the temperature of the mixture gradually to 350° C., the pressure rising to approximately 220 atmospheres during the heating. This temperature is maintained for one hour. The vessel is then allowed to cool and the excess hydrogen is blown off. Octyl alcohol is obtained as the reaction product. If desired the alcohol can be separated by distillation from the lauryl alcohol which served as the solvent or dispersing agent.

If the catalyst is omitted in carrying out the process, the aldehyde corresponding to the fatty acid salt employed is obtained in a very large yield, it being unnecessary to provide an atmosphere of hydrogen. The improved results are due primarily to the use of the solvent aforementioned, the reaction proceeding much more smoothly even at temperatures far below those heretofore employed, and a higher yield resulting.

Alternatively, the formates may be omitted or may be replaced by the salts of other fatty acids. In this case the reaction proceeds smoothly by way of the simple or mixed ketones to yield the secondary alcohols corresponding to the salts employed, or the ketones alone may be produced if desired by the elimination of the step of hydrogenation.

Example II 5 grams of the calcium salts of cocoanut fatty acids and 1.8 grams of calcium acetate are dissolved or dispersed in 10 grams of cyclohexane and the solution together with .7 gram of a copper catalyst are introduced into an autoclave in an atmosphere of hydrogen at a pressure of 130 atmospheres, the mixture being gradually heated to 320° C. During the heating the pressure rises to approximately 275 atmospheres. After the reaction has proceeded for two hours a mixture of secondary alcohols corresponding to the fatty acids of the calcium salts is obtained in an amount equal to approximately 70% of that which should be possible from merely theoretical considerations. The product consists principally of the alcohols $C_{11}H_{21}.CHOH.CH_3$ and $C_{13}H_{25}.CHOH.CH_3$.

It has also been found that the above described processes of obtaining either the aldehydes or the alcohols from the fatty acids may be further modified by the substitution for the calcium salts of the fatty acids or of formic acid of the salts of barium, strontium, or magnesium. The alkali metal salts of the aliphatic carboxylic acids may be similarly converted to carbonyl compounds and alcohols. The heavy metal salts, such as zinc, nickel, or copper soaps may also be employed. Likewise, mixtures of the fatty acids or of formic acid with various bases can be utilized, the process in each instance being carried out in the manner described as suitable when the calcium salts are employed. In the appended claims, where the formic acid salts or fatty acid salts are specified, it should be understood that such terminology includes the mixtures of formic acid or the fatty acid itself with the bases adapted to produce the salts. Where alkaline earth metals are specified in the appended claims it should be understood that magnesium is included.

Example III 5 grams of sodium stearate and 1.8 grams of calcium formate are dissolved in 10 grams of cyclohexane with the application of moderate heat. The resulting liquid mass is then heated in a closed reaction vessel to approximately 300° C., the pressure rising during the heating to about 30 atmospheres. This temperature is maintained for approximately two hours and the material is allowed to cool. As a reaction product a high yield of stearic aldehyde is obtained which may be isolated by distilling off the cyclohexane which was used as the solvent or dispersing agent. Alternatively water or other solvents may be employed, and by proceeding in precisely the same manner simple or mixed ketones can be obtained as the reaction product if the formates are omitted or are replaced by other fatty acid salts.

Example IV 5 grams of sodium stearate and 1.8 grams of calcium formate are dissolved in 10 grams of cyclohexane, moderate heat being applied. Alternatively the liquid used may be water.

The resulting solution is mixed with .68 gram of a copper catalyst which may be made in any suitable manner, for instance as is described in Example I. The mixture is then placed in a closed reaction vessel and hydrogen is forced in under pressure until a pressure of 100 atmospheres is obtained. The vessel is gradually heated to a temperature of 300° C., and during this heating the pressure rises to 200 atmospheres, the temperature being maintained for two hours. The resultant reaction product is then cooled and the excess pressure of hydrogen is blown off. When the cyclohexane is distilled off, stearyl alcohol in a yield of 97% of that theoretically possible is left.

Having thus described the invention, what is claimed as new and desired to be secured by Letters Patent is:

1. A process for producing primary alcohols which comprises heating a mixture of a calcium salt of a fatty acid with at least two carbon atoms and calcium formate in the presence of hydrogen and a hydrogenating catalyst.

2. A process for producing primary alcohols which comprises heating a solution of a calcium salt of a fatty acid with at least two carbon atoms and calcium formate in the presence of hydrogen and a hydrogenating catalyst.

3. A process for producing primary alcohols which comprises heating a solution of a calcium salt of a fatty acid with at least two carbon atoms and calcium formate in the presence of hydrogen and a hydrogenating catalyst, the resulting primary alcohol being used as a solvent for the calcium salts.

4. A process for producing primary alcohols which comprises heating a mixture of a calcium salt of a fatty acid with at least two carbon atoms and calcium formate in the presence of hydrogen and a hydrogenating catalyst, and at a pressure falling between the approximate limits of 100 and 250 atmospheres.

5. A process for producing octylalcohol which comprises heating a solution of calcium octylate and calcium formate in lauryl alcohol in the presence of hydrogen and a hydrogenating catalyst.

6. A process of producing primary alcohols which comprises heating a solution of alkaline-earth metal salts of a fatty acid having at least two carbon atoms and of formic acid and in the presence of hydrogen and a hydrogenation catalyst.

7. A process for producing secondary alcohols which comprises heating a solution of inorganic salts of fatty acids having more than two carbon atoms in the presence of hydrogen and a hydrogenating catalyst.

8. A process for producing secondary alcohols which comprises dissolving alkaline-earth salts of cocoanut-fatty acid and calcium acetate in cyclohexane and heating the resulting solution in the presence of hydrogen and a hydrogenation catalyst.

9. A process for producing stearyl alcohol which comprises dissolving calcium formate and sodium stearate in cyclohexane and heating the solution in the presence of hydrogen and a hydrogenating catalyst.

10. A process for producing alcohols which comprises heating a solution of a calcium salt of a fatty acid having more than two carbon atoms and a calcium salt of a fatty acid having not more than two carbon atoms in the presence of hydrogen and a hydrogenating catalyst.

11. A process for producing alcohols which comprises dissolving a calcium salt of a higher fatty acid and a calcium salt selected from the group consisting of formates and acetates in the alcohol corresponding to the higher fatty acid, and heating the solution in the presence of hydrogen and a copper catalyst.

12. A process for producing alcohols which comprises dissolving a calcium salt of a higher fatty acid and a calcium salt selected from the group consisting of formates and acetates in an organic solvent, and heating the solution in the presence of hydrogen and a hydrogenation catalyst.

13. The process of producing alcohols which comprises heating a solution of an inorganic salt of a fatty acid having more than 2 carbon atoms with a fatty acid salt of a metal of the alkaline earth group in the presence of hydrogen and a hydrogenating catalyst.

14. The process of producing alcohols which comprises treating a solution of an inorganic salt of a fatty acid having more than 2 carbon atoms with a fatty acid salt of a metal of the alkaline earth group at an elevated temperature and pressure in the presence of hydrogen and a hydrogenating catalyst.

15. The process as described in claim 14 wherein the treatment is effected at temperatures of from 150° C. to 400° C.

16. The process as described in claim 14 wherein the treatment is effected at temperatures of from 150° C. to 400° C. and at a pressure of more than 100 atmospheres.

17. The process of producing alcohols which comprises catalytically reducing aldehydes during their production from a mixture of an inorganic salt of a fatty acid having more than 2 carbon atoms with a fatty acid salt of a metal of the alkaline earth group.

18. The process of producing primary alcohols comprising heating a solution containing a mixture of an inorganic salt of a fatty acid having more than 2 carbon atoms with a formic acid salt of a metal of the alkaline earth group, in the presence of hydrogen and a hydrogenating catalyst.

19. The process of producing primary alcohols comprising heating a solution containing a mixture of an inorganic salt of a fatty acid having more than 2 carbon atoms with a formic acid salt of a metal of the alkaline earth group to a temperature of from 150° C. to 400° C. at an elevated pressure in the presence of hydrogen and a hydrogenating catalyst.

20. A process for producing alcohols which comprises heating a solution of a mixture of inorganic salts of fatty acids at least one of which has more than 2 carbon atoms in the molecule in the presence of hydrogen and a hydrogenation catalyst.

21. A process for producing secondary alcohols which comprises heating a solution of an inorganic salt having more than 2 carbon atoms in the presence of hydrogen and a hydrogenating catalyst.

22. The process of producing alcohols which comprises heating a solution of an alkaline earth salt of a fatty acid having more than 2 carbon atoms with a fatty acid salt of a metal of the alkaline earth group in the presence of hydrogen and a hydrogenating catalyst.

23. The process of producing alcohols which comprises heating a solution of an alkali metal salt of a fatty acid having more than 2 carbon atoms with a fatty acid salt of a metal of the alkaline earth group in the presence of hydrogen and a hydrogenating catalyst.

24. The process of producing alcohols which comprises heating a solution of a heavy metal salt of a fatty acid having more than 2 carbon atoms with a fatty acid salt of a metal of the alkaline earth group in the presence of hydrogen and a hydrogenating catalyst.

25. The process of producing alcohols which comprises heating a solution of a nickel salt of a fatty acid having more than 2 carbon atoms with a fatty acid salt of a metal of the alkaline earth group in the presence of hydrogen and a hydrogenating catalyst.

26. The process of producing alcohols which comprises heating a solution of a calcium salt of a fatty acid having from 2 to 18 carbon atoms with a calcium salt of a fatty acid having not more than two carbon atoms at a temperature of from about 150° to about 400° C. at a pressure of from about 30 to 275 atmospheres in the presence of hydrogen and a copper containing catalyst.

HERMANN PRÜCKNER.